L. COATALEN AND H. C. M. STEVENS.
CRANK SHAFT FOR FLUID PRESSURE ENGINES.
APPLICATION FILED MAY 22, 1920.
1,363,571.
Patented Dec. 28, 1920.
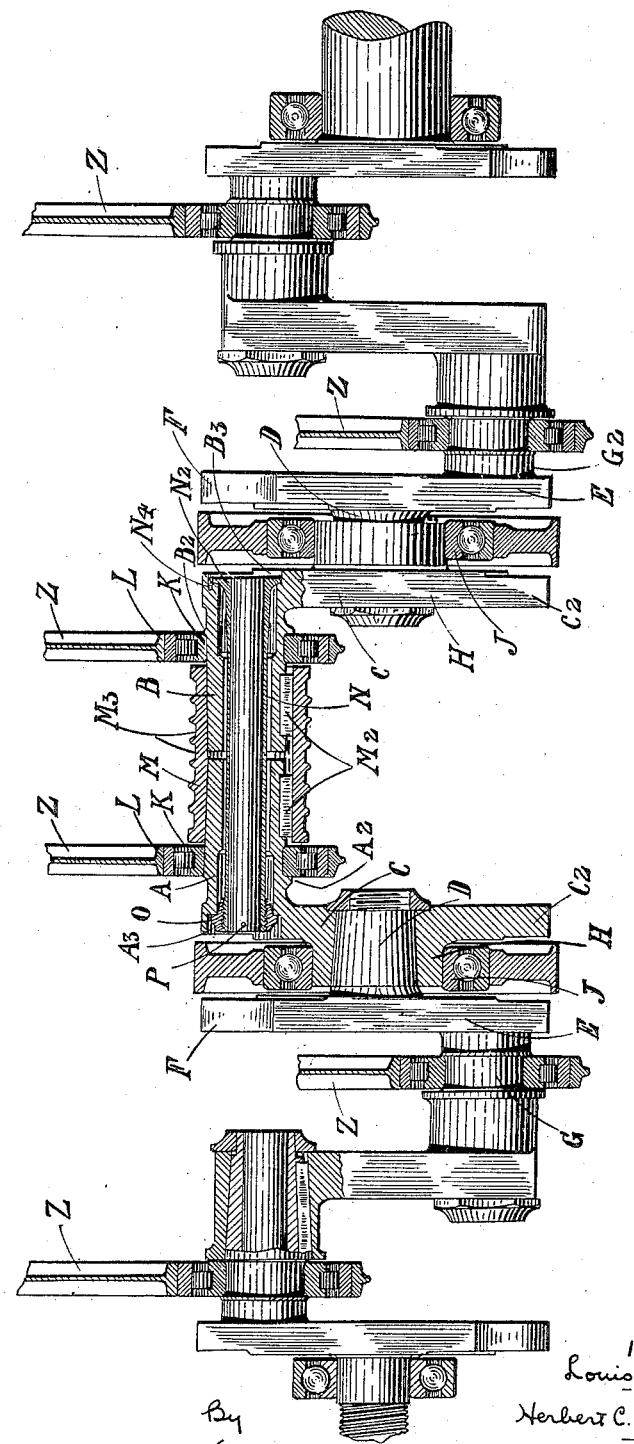
INVENTORS:
Louis Coatalen,
Herbert C. M. Stevens.
By
Spear, Middleton, Donaldson & Hall ATTORNEYS.

UNITED STATES PATENT OFFICE.

LOUIS COATALEN AND HERBERT CHAS. MACLEOD STEVENS, OF WOLVERHAMPTON, ENGLAND, ASSIGNORS OF ONE-HALF TO SUNBEAM MOTOR CAR COMPANY LIMITED, OF WOLVERHAMPTON, ENGLAND.

CRANK-SHAFT FOR FLUID-PRESSURE ENGINES.

1,363,571.  Specification of Letters Patent.  Patented Dec. 28, 1920.

Application filed May 22, 1920. Serial No. 383,500.

*To all whom it may concern:*

Be it known that we, LOUIS COATALEN, engineer, and HERBERT CHARLES MACLEOD STEVENS, engineer, both residing at Wolverhampton, in the county of Stafford, England, have invented certain new and useful Improvements in Crank-Shafts for Fluid-Pressure Engines, of which the following is a specification.

This invention relates to crankshafts for fluid pressure engines of the kind which are built up of web and pin elements attached together by coned surfaces and keys, the connecting rod and journal bearings being of the ball and roller type. It has for its object to provide an improved means for coupling together a pair of co-axial pin or shaft portions where two bearings are required on the pins or shaft portions.

This is necessary where there are two crank pins in the same plane without any intermediate webs or journal bearings, each crank pin having a roller or ball bearing for a separate connecting rod.

According to this invention, the two opposed crank pin ends are coned and enter the coned ends of a sleeve, while a bolt passes through the pins and sleeve and retains the two coned parts in engagement with the sleeve.

The accompanying drawing is an elevation, with parts in section, showing a built-up crankshaft in accordance with this invention for a six-cylinder engine the six connecting rods being indicated at Z.

The two crank pin portions are shown at A and B. Each is integral with a web part C which is fitted upon a short journal shaft portion D of the adjacent element, comprising a web part E, balance weight F, and pin portion G.

Each web C is provided with an internally coned boss H which fits upon the coned shaft portion D of the adjacent element and the webs C may be extended at $C^2$ beyond this shaft portion to balance the crank pin A or B.

Upon each crank web boss H is threaded a ball or roller race J which forms one of the shaft bearings.

Each crank pin A or B receives a ball or roller race K constituting a bearing for a connecting rod big-end L, which race lies up against a shoulder $A^2$ or $B^2$ on the pin. Beyond this bearing K, each crank pin is externally coned and these coned parts are inserted in the coned ends of a sleeve M. The coned surfaces are also provided with keys $M^2$ if desired.

The required fit of the sleeve M on the pins A and B is obtained by a press, but the coned portions are kept in engagement by a bolt N passing through the hollow crank pins A and B. This bolt is preferably hollow and the head $N^2$ lies in a recess $B^3$ in the one crank pin and is prevented from turning by a snug $N^4$, while the nut O lies in another recess $A^3$, and is locked by a split pin at P.

If desired, the sleeve M may be provided with circumferential grooves $M^3$ as shown, to reduce the weight of the revolving mass.

Thus a simple, light and substantial connection is provided.

What we claim as our invention and desire to secure by Letters Patent of the United States is:

In a crankshaft, the combination with a pair of co-axial pins, coned ends on said pins, a connecting sleeve, coned mouths in said sleeve engaging said coned pin ends, a shoulder upon each of said pins, a bearing race between each of said shoulders and the end of said sleeve, and a bolt passing through said pins and said sleeve, substantially as set forth.

In testimony whereof we have signed our names to this specification in the presence of two subscribing witnesses.

LOUIS COATALEN.
      HERBERT CHAS. MACLEOD STEVENS.

Witnesses:
  W. M. ILIFF,
  G. F. MORTIMER.